United States Patent [19]

Yoshino et al.

[11] Patent Number: 4,608,087
[45] Date of Patent: Aug. 26, 1986

[54] HEAT-RESISTANT INORGANIC COMPOSITION

[75] Inventors: Shigeo Yoshino; Tadashi Zenbutsu; Hajime Asami, all of Bizen, Japan

[73] Assignee: Shinagawa Refractories Co., Ltd., Tokyo, Japan

[21] Appl. No.: 664,100

[22] Filed: Oct. 24, 1984

Related U.S. Application Data

[63] Continuation of Ser. No. 387,556, Jun. 11, 1982, abandoned.

[30] Foreign Application Priority Data

Jun. 19, 1981 [JP] Japan ................................. 56-92383

[51] Int. Cl.[4] ............................................... C09D 5/18
[52] U.S. Cl. .............................. 106/18.12; 106/15.05; 106/84; 252/62
[58] Field of Search ................... 106/18.12, 84, 15.05; 252/62

[56] References Cited

U.S. PATENT DOCUMENTS

| 3,262,793 | 7/1966 | Neely et al. | 106/84 |
| 3,285,762 | 11/1966 | Wicken | 106/84 |
| 3,313,007 | 4/1967 | James et al. | 106/84 |
| 3,442,671 | 5/1969 | Rolland et al. | 106/84 |
| 3,620,791 | 11/1971 | Krupnick | 106/84 |
| 3,813,253 | 5/1974 | Neises | 106/84 |

FOREIGN PATENT DOCUMENTS 54-133526 10/1979 Japan .
55-29548 3/1980 Japan .
56-391 1/1981 Japan .

*Primary Examiner*—Lorenzo B. Hayes
*Attorney, Agent, or Firm*—Armstrong, Nikaido, Marmelstein & Kubovcik

[57] ABSTRACT

The invention provides a novel composition useful as a heat-resistant coating material on the surface of a metal or ceramic article or as an adhesive agent for bonding metal articles, ceramic articles, or articles of a metal and a ceramic. The adhesive strength of the composition is so strong that no peeling takes place even after many repeated cycles of rapid heating and cooling. The composition comprises a refractory powder of an inorganic oxide, such as alumina and silica; a powdery inorganic compound having cation-exchangeability and a layered structure, such as mica; and an alkali metal silicate or aluminate as a binder. The maximum particle diameter of the powdery inorganic compound having a layered structure is important and relative to the average particle diameter of the refractory powder.

2 Claims, No Drawings

HEAT-RESISTANT INORGANIC COMPOSITION

This application is a continuation of application Ser. No. 387,556, filed June 11, 1982, now abandoned.

BACKGROUND OF THE INVENTION

The present invention relates to a novel heat-resistant inorganic composition useful as a coating material which is capable of being firmly bonded to a metal surface, such as iron, copper, silver and the like, or to an inorganic material surface, such as inorganic fibers, refractory ceramics, glasses and the like. The novel heat-resistant inorganic composition is also useful as an adhesive agent for bonding metal articles or for bonding articles of a metal and an inorganic material, such as the metals and inorganic materials described above. More particularly, the invention relates to a heat-resistant inorganic composition which is practically useful and is capable of exhibiting excellent adhesion without peeling at elevated temperatures over a wide range of from 100° to 800° C. Further, the heat-resistant inorganic composition of the present invention has a high workability and can easily be used for coating or bonding.

In the prior art, various types of heat-resistant coating compositions have been used for providing high temperature protection for the surface of metallic materials which contact corrosive liquids and gases or molten metals. Heat-resistant coating compositions have also been used as adhesives for providing heat insulating layers of ceramic fiber blocks on the walls of furnaces; and as anti-corrosion coating materials coated on steel-made ducts for exhaust gases at high temperatures and drain pipes; as well as anti-oxidation coating materials coated on the steel-made heat reflectors and heat shields in refuse incinerators. However, only a few known compositions are satisfactory in heat resistance. Among these, those formulated using silicone resins as the binder are relatively superior, although they have the defect that their usability is limited. These silicone-based coating compositions are limited to uses at temperatures of 100° to 200° C. at the highest, because the durability thereof is greatly decreased when used at a temperature higher than 200° C. by rapid degradation of the composition.

There are also known methods for improving the heat resistance of metal articles by coating them with a glaze, and then firing to form an enamel lining as in an enameled ironware. Alternatively, metal articles can be coated with a layer of an inorganic oxide by spray fusion. These methods are, however, disadvantageous due to the difficulties in their coating procedures, and usually the adhesive bonding of a metal, such as iron, copper, silver and the like, and an inorganic material, such as ceramics, ceramic fibers, glasses and the like, is performed by use of a solder glass.

Soldering with a solder glass, however, requires a heat treating at a temperature of 400° to 500° C. or even higher and, therefore, from a practical point of view, such a method is hardly applicable to an article of complicated form or large size, or to a ready-built structure. Studies have been undertaken to develop a method or a solder glass wherein the soldering can be performed at decreased temperatures. However, the studies have not resulted in satisfactory solder glasses. In addition, soldering metal articles with a solder glass to form an adhesive bond therebetween has not been attainable without decreasing the characteristic performance of the metals.

In short, despite repeated attempts in the prior art, there are no known heat-resistant inorganic compositions capable of providing a very firm and stable coating layer or adhesive layer within a temperature range from 100° to 800° C., which can be feasibly coated or bonded at room temperatures.

Japanese Patent Kokai No. 54-133526 proposes an inorganic adhesive agent composed of alumina and sodium silicate suitable for use in adhesive bonding of an aluminous ceramic ware and an iron plate. This adhesive has sufficient adhesive bonding strength, but the disadvantage of poor resistance against heat shock.

Further, Japanese Patent Kokai No. 55-29548 proposes that a composition comprising sodium silicate; an inorganic powder such as calcined clay, nitrides, carbides and metal powders; and an organic surface active agent is useful as an adhesive for bonding a metal and a ceramic by virtue of its capacacity to absorb the strain caused by the differences in the thermal expansions. This adhesive composition is defective because its use is limited due to the fact that the substrate to be bonded therewith cannot be heated at a temperature higher than the decomposition temperature of the surface active agent contained in the composition.

Japanese Patent Publication No. 56-391 proposes a protective coating composition for ferrous materials which contact molten metals. The composition disclosed therein is composed of an aqueous mixture of colloidal silica, sodium oxide, lithium oxide, glycerin, an anionic surface active agent and water, with an admixture of a ceramic powder as the aggregate. This composition is disadvantageous due to its extremely low stability when heated at high temperatures or subjected to rapid temperature changes.

Thus, a satisfactory heat-resistant inorganic composition suitable for coating or adhesive use has not been known hitherto.

SUMMARY OF THE INVENTION

The present invention provides a heat-resistant inorganic composition useful as a coating or an adhesive which can be used or worked without firing as in the formation of enamel linings or a high temperature treatment as in the techniques of spray fusion of inorganic oxides.

The present invention provides an inorganic composition which can be easily used for coating or adhesive bonding by a simple and conventional method of spraying, or brush coating and the like.

The present invention also provides a heat-resistant inorganic composition capable of exhibiting strong and stable adhesion in a wide temperature range of from 100° to 800° C., which is also capable of retaining its adhesion without peeling even when cycles of rapid heating and quenching are repeated.

Other advantages of the present invention will be made clear by the following description.

The heat-resistant inorganic composition, which has been discovered as a result of the extensive investigations undertaken by the inventors and which has a great practical value, comprises:

(a) a refractory powder of an inorganic oxide, such as alumina, silica, magnesia and chromium oxide, (b) a powdery inorganic compound having cation-exchangeability and a layered or lamellar structure, such as mica, and (c) an alkali metal silicate or an alkali metal aluminate as a binder, the largest particle diameter of the powdery inorganic compound, which can be a layered mineral, is smaller than the average particle diameter of the refractory powder of an inorganic oxide.

DETAILED DESCRIPTION OF THE PREFERRED EMBODIMENTS

The refractory powder used as component (a) in the inventive composition is exemplified by ordinary refractory materials such as silica, alumina, magnesia, chromium oxide and the like. Since refractory powders having basicity, such as magnesia and the like, harden the composition at room temperature within a few minutes to several hours after blending; acidic or neutral refractory powders are preferably used when it is desired not to harden the composition on standing after blending.

Further, the refractory powder should be thermally stable and, therefore, refractory materials prepared by heat treatment are suitably used in the inventive compositions. When the refractory powder contains a large amount of crystal water or carbonates, heating of the composition produces water vapor, carbon dioxide or other gases, which decompose the adhesive or coating material so that cracks are sometimes formed therein, resulting in an undesirable decrease in the adhesive bonding strength.

The particle diameter of the refractory powder preferably does not exceed 44 μm. When the refractory powder contains considerable amounts of particles coarser than 44 μm, difficulties are encountered in forming a thin coating layer and the resultant coating layer is susceptible to peeling by temperature changes.

The refractory powders used in the inventive composition may be used either singly or as a combination of at least two different types, according to need.

The component (b) in the inventive composition, which is a powdery inorganic compound having cation-exchangeability in the form of lamellar particles, or particles having a layered structure, is exemplified by various types of natural minerals such as pyrophyllite, talc, muscovite, phlogopite, sericite, illite, glauconite, celadonite, clintonite, montmorillonite, nontronite, saponite, vermiculite, kaolinite, dickite, nacrite, halloysite, hydrated halloysite, antigorite and the like as well as the synthesized minerals of the same type. These powdery inorganic compounds may be used either singly or as a combination of two or more types, according to need. When the inventive composition is desired to provide a stable adhesive bond; for example, when quenched at a rate larger than 500° C. per second; the lamellar inorganic particles should preferably contain no hydroxy groups in its structure, and have a well-developed lamellar structure and cation-exchangeability. It is further desirable that the layered or lamellar inorganic compound is swellable in water. In this respect, natural micas and artificially synthesized micas are preferred as the component (b).

The powdery lamellar inorganic compounds in the inventive composition provide an absorbing function or action which mitigates against any strains in the coating or adhesive layer caused by the difference in the thermal expansion between the articles coated or bonded and the inventive composition, when the articles coated or bonded with the coating or adhesive layer of the present invention undergo a temperature change.

The amount of the lamellar inorganic compound in the inventive composition is preferably in the range of from 10 to 90% by weight based on the total amount of the aggregate composed of the refractory powder as the component (a) and the lamellar inorganic compound as the component (b). When the amount of the lamellar inorganic compound or particles is smaller than 10% by weight, no sufficient buffering effect or absorbing action can be obtained so that the coating layer or adhesive layer may peel by temperature elevation or cooling. When the amount of the lamellar inorganic compound or particles is excessively large or over 90% by weight, the lamellar particles in the coating layer or adhesive layer are oriented in parallel to the substrate surface with the c-axis perpendicular to the surface, which results in the buffering or absorbing action exhibited by the lamellar particles becomes insufficient, so that the coating layer or adhesive layer is readily peeled off by temperature changes.

It is also important that the lamellar inorganic compound is substantially free from coarse particles having diameters larger than the average particle diameter of the refractory powder. In this respect, the particles of the lamellar inorganic compound should preferably have a diameter substantially smaller than 30 μm. Lamellar inorganic compound particles of larger diameters than the average particle diameter of the refractory powder are undesirable because they decrease the buffering or absorbing action of the lamellar particles of the inorganic compound in the inventive composition.

The component (c) in the inventive composition is a binder such as an alkali silicate or an alkali aluminate. Suitable alkali silicates are exemplified by #1, #2, #3 and #4 sodium silicates, sodium orthosilicate, sodium sesquisilicate, sodium metasilicate, potassium silicate, lithium silicate and the like. The use of the sodium silicates is economically advantageous in view of the expensiveness of potassium and lithium silicates. The alkali aluminate is exemplified by lithium aluminate, sodium aluminate and potassium aluminate. The use of sodium aluminate is more economical because of the expensiveness of the aluminates other than sodium aluminate.

The amount of the binder used in the inventive composition can be adequately determined by the desired fluidity of the composition. The water content of the binder material lost by drying is desirably 90% by weight or less, because the strength of adhesive bonding is disadvantageously decreased by the use of a binder material containing 90% by weight or more of water. The amount of the binder material calculated as solid is preferably in the range from 15 to 50% by weight or, more preferably, from 20 to 30% by weight based on the total amount of the aggregate composed of the refractory powder and the lamellar inorganic compound. When the amount of the binder is smaller than 15% by weight, the adhesive bonding strength of the coating layer may be insufficient. An excessively large amount of the binder over 50% by weight is undesirable due to the decreased heat resistance of the resultant composition.

The mechanism for the excellent adhesive bonding and the excellent stability against temperature changes exhibited by the inventive composition is not well understood. It is presumable that certain types of chemical reactions may take place between the substrate surface and the alkali silicate or alkali aluminate as the binder. For example, a hydroxoferrate is formed on the surface of an iron substrate coated with the inventive composition at room temperature which exhibits good adhesion; $NaFeO_2$ is also formed by heating forming a chemical linkage to exhibit excellent adhesion. When the substrate is composed of inorganic oxides such as ceramics or glasses, the chemical bonding may be obtained mainly with a siloxane linkage of silicon-oxygen-silicon which also exhibits excellent adhesion.

The interaction between the lamellar inorganic compound and the alkali silicate or alkali aluminate is also not completely understood; however, it is presumed that the strength of the coating layer is obtained by the mutual physicochemical bonding between the components of the present composition. The stability of the coating layer against temperature changes may be obtained, on the other hand, by the lamellar particles of the inorganic compound which absorb the strain caused by the difference in the thermal expansion between the substrate surface and the coating or adhesive layer formed with the inventive composition.

The heat-resistant inorganic composition of the present invention can be used as a coating material or an adhesive agent and has good workability in that it is coated or applied by conventional methods such as being sprayed or brush-coated onto the substrate surface of a metal or an inorganic material; without the heat treatment required by the prior art, such as in the enameling processes. The evaporation of the water from the composition applied to the substrate surface provides very firm adhesion, and the thus formed coating layer will not peel, even when heated to a temperature of 800° C. or higher or when subjected to rapid temperature changes with subsequent heating and quenching.

The present invention is described in further detail by the way of the following examples. In the examples, the formulation of the compositions is always expressed in parts by weight.

EXAMPLE 1

Various coating compositions were prepared by uniformly blending the respective components in the amounts indicated in Table 1 below. Each of the compositions was applied onto test panel surfaces of iron, copper, silver, zinc, and nickel, and then dried. These test panels were heated rapidly to 500° C. and then; after keeping for 8 hours at this temperature, these panels were quenched by putting into water at 10° C. Similarly, the test panels were subjected to 50 repeated cycles of heating and quenching; each cycle being composed of the steps of rapidly heating the panel to 500° C. or 800° C.; maintaining this temperature for 8 hours, and then quenching. The condition of the coating layers on the test panels with respect to peeling was visually examined after the 50 repeated cycles, and the results are shown in Table 1 in three grades of A, B and C. Grade A represents an excellent condition of adhesion without peeling of the coating. Grade B represents a partial peeling of the coating; Grade C represents complete peeling over the whole area of the coating. In the table, the compositions Nos. 5 and 6 were prepared for comparative purposes by using the above procedures. It is clear from this table that the inventive compositions Nos. 1 to 4 have an unexpected superior adhesiveness when compared to comparative compositions Nos. 5 and 6. For a further comparison, a commercially available silicone sealant (a pasty silicone compound curable into a rubbery elastomer) was used in place of the inventive compositions, however, the heat resistance of the coating layers obtained therewith on each of the test panels was poor and the coating layer was completely peeled off after only a single cycle of heating and quenching.

EXAMPLE 2

The compositions Nos. 1 to 6 prepared in Example 1 as well as the silicone sealant were used as an adhesive for bonding together two test panels of either the same type or different types. Each of the thus prepared test specimens of the two test panels adhesively bonded together was subjected to 50 cycles of rapid heating to 800° C. and quenching; and the adhesive bonding strength thereof in $kg/cm^2$ was determined with a tensile tester to give the results shown in Table 2. The adhesive bonding obtained by use of the comparative compositions Nos. 5 and 6 and the silicone sealant was destroyed after only a single cycle of the rapid heating and quenching so that no results could be obtained by the measurements of the adhesive bonding strength for the comparative compositions. Accordingly, this Example illustrates the unexpectedly superior adhesive bonding properties of the inventive compositions.

TABLE 1

|  |  |  | Inventive Composition |  |  |  | Comparative composition |  |
|---|---|---|---|---|---|---|---|---|
| Composition No. |  |  | 1 | 2 | 3 | 4 | 5 | 6 |
| Refractory powder | Alumina | −44 μm | 85 |  |  | 10 | 100 |  |
|  | Silica | −30 |  | 85 |  | 10 |  | 5 |
|  | Pyrophyllite | −44 |  |  | 50 |  |  |  |
| Lamellar inorganic compound | Montmorillonite | −10 | 15 |  |  |  |  | 95 |
|  | Phlogopite | −10 |  | 15 |  | 60 |  |  |
|  | Swellable aritificial mica | −5 |  |  | 50 | 20 |  |  |
| Binder | #1 sodium silicate (40% aqueous solution) |  | 50 |  |  |  | 60 |  |
|  | #3 Sodium silicate (40% aqueous solution) |  |  | 60 |  | 55 |  |  |
|  | Sodium aluminate (50% aqueous solution) |  |  |  | 55 |  |  | 65 |
| 50 cycles of 8 hours at 500° C., quenching & rapid heating | Iron panel |  | B | A | A | A | B | B |
|  | Copper panel |  | B | A | A | A | C | C |
|  | Silver panel |  | B | A | A | A | C | C |
|  | Nickel panel |  | B | A | A | A | B | B |
|  | Alumina panel |  | B | A | A | A | A | B |
| 50 cycles of 8 hours at 800° C., quenching & rapid heating | Iron panel |  | B | A | A | A | C | C |
|  | Copper panel |  | B | A | A | A | C | C |
|  | Silver panel |  | B | A | A | A | C | C |
|  | Nickel panel |  | B | A | A | A | C | C |
|  | Alumina panel |  | B | A | A | A | C | C |

TABLE 2

| Combination of bonded materials | Composition No. |  |  |  |
|---|---|---|---|---|
|  | 1 | 2 | 3 | 4 |
| Iron panel vs. iron panel | 2.0 | 30 | 30 | 25 |
| Iron panel vs. copper panel | 3.0 | 40 | 35 | 30 |
| Iron panel vs. stainless steel panel | 2.5 | 30 | 25 | 25 |
| Iron panel vs. ceramic fiber | (Ceramic fibers broken) |  |  |  |
| Iron panel vs. alumina panel | 7.0 | 50 | 50 | 40 |
| Quartz glass vs. alumina panel | 7.5 | 30 | 35 | 40 |

What is claimed is:

1. A heat-resistant inorganic composition which comprises a refractory powder of an inorganic oxide; a powder of an inorganic compound having cation-exchangeability, a layered structure, water swellability and no hydroxy groups; and a binder of sodium silicate; wherein the refractory powder of an inorganic oxide is composed substantially of particles having diameters not exceeding 44 μm; the powder of an inorganic compound having a layered structure is composed substantially of particles having diameters not exceeding 30 μm selected from the group consisting of synthesized mica and phlogopite, the largest particle diameter of which is smaller than the average particle diameter of the refractory powder of an inorganic oxide; the weight ratio of the refractory powder of an inorganic oxide to the inorganic compound having a layered structure is in the range from 10:90 to 90:10; and the amount of binder is in the range from 15 to 50% by weight as a solid based on the total amount of the refractory powder and the powder of an inorganic compound having a layered structure.

2. The heat-resistant inorganic composition as claimed in claim 1, wherein the refractory powder of an inorganic oxide is selected from the group consisting of alumina, silica, magnesia and chromium oxide.

* * * * *

UNITED STATES PATENT AND TRADEMARK OFFICE
CERTIFICATE OF CORRECTION

PATENT NO. : 4,608,087
DATED : August 26, 1986
INVENTOR(S) : SHIGEO YOSHINO ET AL It is certified that error appears in the above-identified patent and that said Letters Patent is hereby corrected as shown below:

On the cover page, Item [30], change "19" to --- 17 ---.

Signed and Sealed this

Fourteenth Day of April, 1987

Attest:

DONALD J. QUIGG

Attesting Officer

Commissioner of Patents and Trademarks